United States Patent [19]

Ferrara et al.

[11] 4,025,923
[45] May 24, 1977

[54] SYNCHRONOUS FILTER FOR VOR SYSTEMS

[75] Inventors: John M. Ferrara, Hardley; Frank Patterson Smith, 2nd, Dresher, both of Pa.

[73] Assignee: Narco Scientific Industries, Inc., Fort Washington, Pa.

[22] Filed: Jan. 14, 1976

[21] Appl. No.: 648,900

[52] U.S. Cl. .......................... 343/106 R; 324/83 D
[51] Int. Cl.² ......................................... G01S 1/46
[58] Field of Search .............. 343/106 R; 324/83 D, 324/83 FE

[56] References Cited

UNITED STATES PATENTS

| 3,386,096 | 5/1968 | Lundgreen et al. | 343/106 R |
| 3,792,473 | 2/1974 | Sawicki | 343/106 R |

*Primary Examiner*—Richard A. Farley
*Assistant Examiner*—Richard E. Berger
*Attorney, Agent, or Firm*—Paul & Paul

[57] ABSTRACT

A circuit which allows the operation of a VOR receiver in the presence of unwanted interference signals without sacrificing a fast response to omnirange bearing selector changes. A switching-type synchronous filter is used to filter the 30 Hz AM channel signal in the receiver. The narrow bandwidth of this synchronous filter rejects unwanted interference signals without introducing phase shift into the desired signal. The switching signal for the synchronous filter is generated by the FM channel in such a manner that the switching filter center frequency follows the input frequency. The use of a synchronous filter allows rejection of interfering AM signals that lie outside a narrow pass band, while allowing the receiver to follow variations in frequency of the transmitted signal.

5 Claims, 3 Drawing Figures

SYNCHRONOUS FILTER FOR VOR SYSTEMS

BACKGROUND OF THE INVENTION

This invention relates generally to aircraft navigation systems and more particularly to an interference suppression circuit for use in airborne VHF Omnirange (VOR) receivers.

In general aviation, the standard navigation system is a VHF Omnirange network, commonly referred to as VOR, wherein the pilot of an aircraft can determine his bearing with reference to the location of selected VOR transmitters. The transmitters at various geographical locations operate on different VHF carrier frequencies, but each conveys a pair of 30-Hz signals which, when received by the aircraft, provide an indication of the angular position of the aircraft relative to the particular transmitter by means of the phase relationship of the signals. Ordinarily, one of the 30 Hz signals is established as a phase reference signal and is frequency modulated upon a subcarrier having a nominal frequency of 9960 Hz, the subcarrier in turn being amplitude modulated upon the VHF carrier. The VOR station also transmits a CW radio signal through a rotating directional antenna such that a 30 Hz AM signal is provided in space at the receiving aircraft. This AM signal has a varying phase for each degree of bearing away from a reference bearing chosen for the station. The reference bearing is due North. An aircraft receiving both the AM and FM signals contains a phase detector which detects the phase difference between the 30 Hz modulation carried by the AM and FM signals. This phase difference is measured in degrees and is a direct indication of the bearing of the aircraft relative to the reference phase of the VOR station.

In order to ensure that accurate bearing indication is obtained, it is essential that the airborne receiver precisely measure the phase relationship between the reference FM signal and the rotating AM signal. Unwanted interference signals occurring close to the frequency of interest, or harmonics thereof, must be filtered to ensure that accurate phase comparisons are made, without slowing the display of bearing information to an unacceptable degree. Prior art VOR receivers, such as the circuit disclosed by Lundgreen et al in U.S. Pat. No. 3,386,096 have employed phase lock loops to achieve this, but this can introduce variable phase errors because of the inherent nature of the devices.

SUMMARY OF THE INVENTION

The disclosed filter circuit employs a switching-type synchronous filter to filter the 30 Hz AM channel signal of the VOR receiver. A phase lock loop is employed in the FM channel to maintain the synchronous filter in frequency lock with the 30 Hz FM reference signal. The switching input signal for the synchronous switched filter is derived from the FM channel in such a manner that the center frequency of the synchronous filter tracks any change in center frequency of the transmitted signal. The band width of the synchronous switched filter is narrow to provide a high degree of rejection of unwanted interference signals occurring close to the desired frequency. A fast time constant is employed in the phase lock loop on the FM channel to allow the synchronous filter to follow rapid excursions of frequency of the reference signal.

Accordingly, it is a primary object of this invention to provide a filter circuit which provides a high degree of unwanted signal rejection in the AM channel, without affecting the ability of the system to respond quickly to changes in the setting of the omnirange bearing selector.

It is another object of this invention to provide a filter circuit which will track an FM reference signal which jitters rapidly in frequency.

It is another object of this invention to provide a filter circuit for a VOR receiver which does not introduce phase distortion in the filtered signals.

These and other objects of the invention can be readily ascertained by reference to the appended description and figures.

DESCRIPTION OF THE PREFERRED EMBODIMENT

Figure 1:
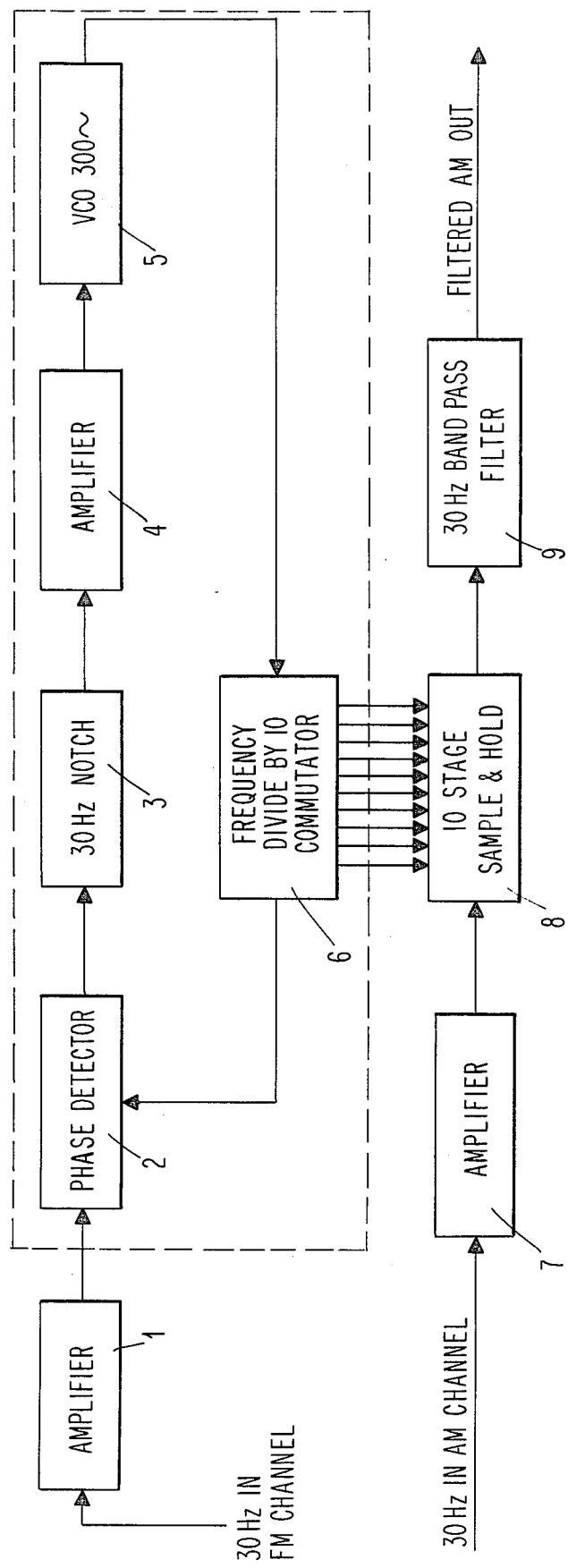
FIG. 1 shows in block diagrammatic form an illustrative embodiment of the present invention.

Before discussing the specifics of the preferred embodiment, it will probably be helpful to outline the systems design considerations which lead to the selection of a switched synchronous filter for the 30 Hz AM channel. Basically, the problem is that of achieving a narrow bandwidth in the AM channel, to filter out unwanted interfering signals, while maintaining adequate response to changes in the omnirange bearing selector (OBS) setting, and an ability to maintain lock on VOR composite signals wherein the reference modulation may be varying slightly.

If an RF signal of carrier frequency $\omega_c$ containing a VOR 30 Hz AM signal modulated 30% is itself amplitude modulated 20% by an interfering signal $\omega$, the result can be expressed as:

$$f(t) = (1 + 0.20 \cos \omega\tau)(1 + 0.30 \cos \omega_{30}\tau) \cos \omega_c \tau$$
$$= (1 + 0.20 \cos \omega\tau + 0.30 \cos \omega_{30}\tau + 0.06 \cos \omega\tau \cos \omega_{30}\tau) \cos \omega_c \tau$$

After linear demodulation and multiplication by $\sin \omega_{30}\tau$ in a phase comparator $$g(\tau) = 0.10 \sin(\omega_{30}+\omega)\tau + 0.10 \sin(\omega_{30}-\omega)\tau + 0.15 \sin 2\omega_{30}\tau + 0.015 \sin(2\omega_{30}+\omega)\tau + 0.015 \sin(2\omega_{30}-\omega)\tau$$

The first two terms represent the phase comparator output for the unwanted modulation, the third term is the VOR indication at null, and the last two terms are intermodulation products. Higher order terms will be present in the output of practical phase comparators; however, their magnitude is sufficiently below the desired products that they may be ignored. When passed through a low-pass filter to suppress frequencies of $\omega_{30}$ and higher, this becomes $$h(\tau) = 0.10 \sin(\omega_{30}-\omega)\tau + 0.015 \sin(2\omega_{30}-\omega)\tau$$

The first term creates low frequency interference when $\omega$ is close to 30 Hz, and the second term when $\omega$ is close to 60 Hz.

Assume, for example, that it is desired to design a VOR receiver such that the bearing indicator will be accurate within 1° when operating in the presence of an interfering signal ω of frequency 29.5 Hz. One way of achieving this is to attenuate the 29.5 Hz interference signal prior to phase comparison. To determine the exact amount of attenuation required, it is necessary first to find the scale factor of the indicator. If the original VOR signal has a phase shift of $\phi$, then the third term in the expression for $g(\tau)$ becomes the two terms $$+ 0.15 \sin (2\omega_{30}\tau + \phi) - 0.15 \sin \phi$$

where the second term is the true left-right indication. For $\phi = 1°$ this term has a magnitude of −0.00262. The undesired signal represented by the first term in $h(\tau)$ has an amplitude of 0.10. Therefore, to reduce this to a level corresponding to 1° requires attenuation by a factor of 0.0262. This is expressible as −32 db.

To achieve the required degree of filtering, without adversely affecting the bearing response time of the indicator, it can be shown that the optimum circuit is a band-pass filter in the AM channel which appears like a first-order system with a time constant of about two seconds.

There are several methods by which a relatively sharp first-order band-pass filter can be constructed. Prior Art VOR receivers, such as that disclosed by Lundgreen et al in U.S. Pat. No. 3,386,096, employ phase lock loops in both the FM and AM channels. The use of a phase lock loop, however, can introduce a phase error in the system, due to the variance of offset voltage of the devices with changes in temperature, since the devices involve some form of integration.

The selection of a synchronous switched filter offers significant advantages. It introduces zero phase shift at the center frequency of the filter, which ensures high accuracy for the system. Further, the center frequency of the switch filter is varied by the switching signal, as described in detail below, with a result that the filter operates over a wider frequency than its fixed 3 db bandwidth.

Figure 3:
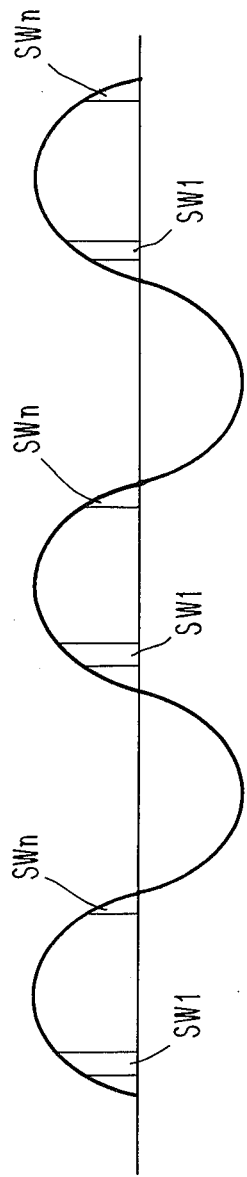
FIG. 3 shows a waveform illustrating operation of the principles of the present invention.

FIG. 1 is a block diagram of the filter circuit of this invention. The recovered 30 Hz FM channel signal is fed to a phase lock loop (shown within the dashed line) through a lowpass amplifier 1. The voltage controlled oscillator 5, runs at 300 Hz. The output of VCO 5 is applied to a frequency divide by 10 commutator 6, which provides a 30 Hz input to phase detector 2, and also supplies 10 outputs to 10 FET switches so that each switch is closed for 1/10 of a 30 Hz period. The ten switches are connected to ten capacitors (see FIG. 2) which store the average value of the signal present when the switch is closed, as shown in FIG. 3. This results in a ten-step approximation to the input 30 Hz signal which is filtered by filter 9 to recover the 30-Hz fundamental.

Figure 2:
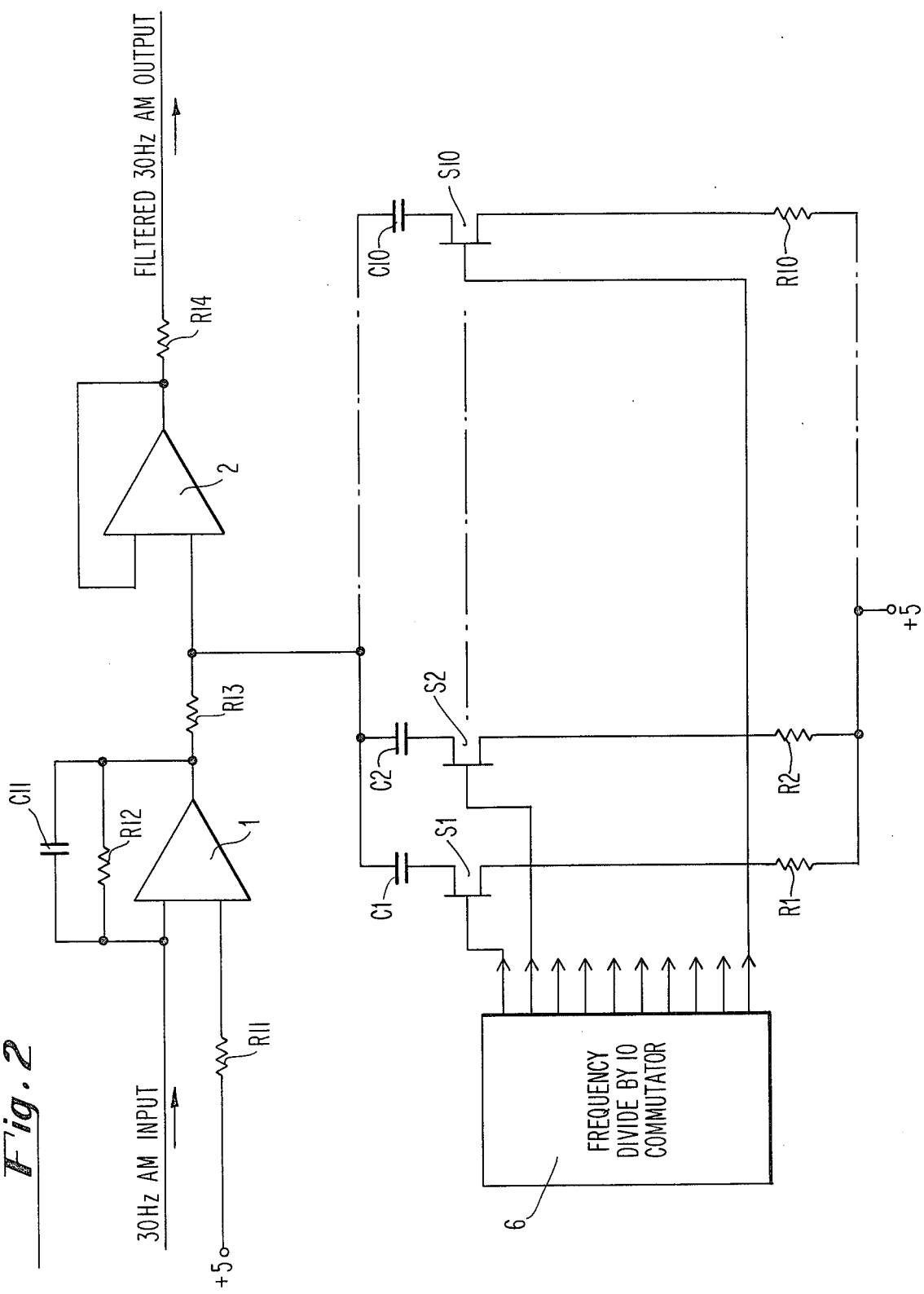
FIG. 2 illustrates a switched synchronous filter operable in accordance with the embodiment of FIG. 1.

FIG. 2 illustrates the circuitry of the conventional switched synchronous filter. This circuit operates as follows:

Operational amplifier 1 amplifies the 30 Hz AM input signal, and applies it through R13 to each of the ten identical RC networks, which are individually controlled by switches $S_1$ through $S_{10}$. The RC time constant of the circuit, and hence the bandwidth of the filter, can easily be changed by changing the value of R13.

Each capacitor is turned on by its associated switch during 1/10 of the period of the 30 Hz signal. The switches are activated by individual outputs from the frequency Divide By 10 Commutator 6.

When the capacitors $C_1 - C_{10}$ are activated, they charge up to an average value, which appears at the output of isolation amplifier 2. This output is then applied to an output filter (not shown) to remove the 300 Hz components from the output of the synchronous filter. The use of a synchronous switched filter in the AM channel, coupled to a fast time constant phase lock loop in the FM channel, offers significant system advantages. The ground station transmitting the composite VOR signal is so designed that the 30 Hz FM signal and 30 Hz AM signal change frequencies simultaneously. Regulations require that this frequency be maintained within one percent, but, in practice, excursions of as much as 0.5 Hz have been observed when a ground station goes to standby power. Also, when operating under emergency power the frequency jitter of the ground station is so great that a phase lock loop with a long time constant is unuseable.

For such rapid and extreme changes of the 30 Hz rate, the system of the present invention reacts quickly and effectively. The phase lock loop rapidly locks to the new frequency and this changes the switching rate in the synchronous filter. This changes the center frequency of the synchronous filter without requiring a significant change in the distribution of charges on the ten capacitors. Therefore, the speed of response to such changes is dependent on the time constant of the fast phase lock loop in the FM channel rather than the longer time constant of the synchronous filter in the AM channel.

The foregoing discussion and the accompanying drawings are intended as illustrative, but are not to be construed as limiting. Still other variations within the spirit and scope of this invention will readily present themselves to one skilled in the art.

What is claimed is:

1. A filter circuit for use with a VOR receiver which provides a narrow bandpass in the 30 Hz AM channel to reject interfering signals comprising;
   an FM channel to amplify and phase detect an input 30 Hz FM signal;
   an AM channel to amplify and filter an input 30 Hz AM signal wherein the filter is a synchronous switched filter;
   a phase lock loop in the FM channel to maintain the frequency of the FM channel locked to the frequency of the FM input signal and to provide the switching input signal to the synchronous switched filter;
   filter means after the synchronous switched filter to recover the 30 Hz AM fundamental frequency.

2. The filter circuit of claim 1 wherein said phase lock loop involves a time constant adapted in accordance with the rate of frequency changes in said FM reference signal to allow the FM channel of the receiver to track rapid changes in frequency of the FM reference signal.

3. The filter circuit of claim 1 wherein the synchronous filter comprises:
   a plurality of identical RC circuits;
   switching means to connect each of the identical RC circuits to the AM channel to operate as an RC filter, wherein the switching frequency is $n$ times the FM signal frequency.

4. The filter circuit of claim 3 wherein the time constant of the synchronous filter is 2 seconds.

5. The filter circuit of claim 4, wherein there are ten identical RC circuits, each having a time constant of 0.2 seconds, and wherein the switching frequency is 300 Hz.

* * * * *